(12) United States Patent
McLeod

(10) Patent No.: US 7,389,606 B2
(45) Date of Patent: Jun. 24, 2008

(54) HUNTING DECOY

(76) Inventor: J. Douglas McLeod, 112 Covey La., Walterboro, SC (US) 29488

( * ) Notice: Subject to any disclaimer, the term of this patent is extended or adjusted under 35 U.S.C. 154(b) by 0 days.

(21) Appl. No.: 11/727,342

(22) Filed: Mar. 26, 2007

(65) Prior Publication Data

US 2007/0251134 A1    Nov. 1, 2007

Related U.S. Application Data

(60) Provisional application No. 60/795,185, filed on Apr. 27, 2006.

(51) Int. Cl.
*A01M 31/06* (2006.01)
(52) U.S. Cl. ............................................................. 43/2
(58) Field of Classification Search ................ 43/2, 43/3; D22/125; 446/101, 387, 388, 488, 446/487, 108; 40/124.19, 538, 539; 434/81, 434/86; 273/348, 408, 409
See application file for complete search history.

(56) References Cited

U.S. PATENT DOCUMENTS

| | | | | |
|---|---|---|---|---|
| 244,038 A * | 7/1881 | Danz, Jr. | ........................... | 43/3 |
| 274,124 A * | 3/1883 | Keller | ............................. | 43/3 |
| 282,851 A * | 8/1883 | Danz, Jr. | ........................... | 43/3 |
| 311,877 A * | 2/1885 | Danz, Jr. | ........................... | 43/3 |
| 381,391 A * | 4/1888 | Law | ........................... | 446/387 |
| 390,966 A * | 10/1888 | Heller | ......................... | 446/387 |
| 412,109 A * | 10/1889 | Lindner | ...................... | 446/370 |
| 470,564 A * | 3/1892 | Henderson et al. | ................ | 43/3 |
| 554,368 A * | 2/1896 | Kunselman | ...................... | 43/3 |
| 565,450 A * | 8/1896 | Gibson | ......................... | 40/539 |
| 575,283 A * | 1/1897 | Frantz | ............................. | 43/3 |
| 585,092 A * | 6/1897 | Gibson | ....................... | 446/388 |
| 586,145 A * | 7/1897 | Sievers, Jr. | ...................... | 43/2 |
| 673,846 A * | 5/1901 | Rauert | ............................. | 43/3 |
| 677,118 A * | 6/1901 | Coudon | ........................... | 43/3 |
| 694,732 A * | 3/1902 | Coudon | ........................... | 43/3 |
| 710,433 A * | 10/1902 | Coudon | ........................... | 43/3 |
| 722,682 A * | 3/1903 | Dills | ............................. | 43/3 |
| 735,314 A * | 8/1903 | Syms | ............................. | 43/3 |
| 760,683 A * | 5/1904 | Coudon | ........................... | 43/3 |
| 796,147 A * | 8/1905 | Reynolds | ......................... | 43/3 |
| 942,103 A * | 12/1909 | Rigney | ........................... | 43/2 |

(Continued)

FOREIGN PATENT DOCUMENTS

GB    2189124 A  * 10/1987

(Continued)

*Primary Examiner*—Darren W Ark
(74) *Attorney, Agent, or Firm*—Richard C. Litman

(57) ABSTRACT

The hunting decoy includes first and second panels, each panel having an image formed on front and rear surfaces thereof to simulate an animal. Each of the first and second panels includes a pair of head portions, a main body portion, and a pair of legs. The first panel has a first slot formed therein, which extends from a top edge of the main body portion downward to a central region of the first main body portion. The second panel has a second slot formed therein, which extends from a bottom edge of the main body portion upward to a central region of the second main body portion. The first panel is releasably joined to the second panel at their respective slots and, preferably, the first panel is positioned substantially orthogonal to the second panel to form a free-standing cruciform decoy.

12 Claims, 8 Drawing Sheets

U.S. PATENT DOCUMENTS

| | | | | |
|---|---|---|---|---|
| 959,655 A * | 5/1910 | Tuck | | 40/124.19 |
| 977,787 A * | 12/1910 | Davis | | 43/3 |
| 990,154 A * | 4/1911 | Mitchell | | 446/387 |
| 1,026,861 A * | 5/1912 | Haskell | | 446/388 |
| 1,052,187 A * | 2/1913 | Stranders | | 40/539 |
| 1,062,713 A * | 5/1913 | Johnson | | 43/3 |
| 1,066,769 A * | 7/1913 | Waddington | | 446/387 |
| 1,083,882 A * | 1/1914 | Hindmarsh | | 43/3 |
| 1,181,421 A * | 5/1916 | Apt | | 446/387 |
| 1,194,678 A * | 8/1916 | Stranders | | 40/539 |
| 1,195,527 A * | 8/1916 | Stranders | | 40/539 |
| 1,211,590 A * | 1/1917 | Kennedy | | 43/2 |
| 1,227,129 A * | 5/1917 | Frueh | | 43/2 |
| 1,292,191 A * | 1/1919 | Wiederanders | | 446/387 |
| 1,298,361 A * | 3/1919 | Levy | | 43/3 |
| 1,316,566 A * | 9/1919 | Fauble | | 43/3 |
| 1,368,483 A * | 2/1921 | Carter | | 40/124.191 |
| 1,376,282 A * | 4/1921 | Kauffman | | 43/2 |
| 1,395,127 A * | 10/1921 | Lovett | | 40/5 |
| 1,428,216 A * | 9/1922 | Chase | | 43/3 |
| 1,437,764 A * | 12/1922 | Woods | | 43/3 |
| 1,473,612 A * | 11/1923 | Dewey | | 43/3 |
| 1,562,700 A * | 11/1925 | Herring | | 40/538 |
| 1,571,711 A * | 2/1926 | Dewey | | 43/3 |
| 1,603,114 A * | 10/1926 | Johnson | | 43/3 |
| 1,681,537 A * | 8/1928 | Hitchcock | | 446/387 |
| 1,718,384 A * | 6/1929 | Sherman | | 43/3 |
| 1,782,042 A * | 11/1930 | Kunkel | | 43/3 |
| 1,948,624 A * | 2/1934 | Lyons et al. | | 43/3 |
| 2,007,791 A * | 7/1935 | Burns | | 446/387 |
| 2,035,254 A * | 3/1936 | Aker | | 40/539 |
| 2,103,748 A * | 12/1937 | Horr | | 40/539 |
| 2,139,822 A * | 12/1938 | Harris | | 446/387 |
| 2,189,550 A * | 2/1940 | Higgins | | 446/387 |
| 2,237,897 A * | 4/1941 | Vos | | 43/2 |
| 2,313,353 A * | 3/1943 | Mills | | 43/3 |
| 2,314,744 A * | 3/1943 | Warren | | 446/387 |
| 2,382,746 A * | 8/1945 | Price | | 40/539 |
| 2,395,247 A * | 2/1946 | Buffenbarger | | 43/3 |
| 2,441,753 A * | 5/1948 | Carpenter | | 43/3 |
| 2,450,572 A * | 10/1948 | Ballard | | 43/3 |
| 2,466,626 A * | 4/1949 | Valasek | | 43/3 |
| 2,478,585 A * | 8/1949 | Kouba | | 43/3 |
| 2,489,271 A * | 11/1949 | Colgan | | 43/3 |
| 2,535,445 A * | 12/1950 | Miller et al. | | 43/3 |
| 2,536,338 A * | 1/1951 | Withey et al. | | 43/3 |
| 2,639,534 A * | 5/1953 | Stossel | | 43/3 |
| 2,662,327 A * | 12/1953 | Petersen | | 43/3 |
| 2,706,357 A * | 4/1955 | Nigh et al. | | 43/3 |
| 2,711,038 A * | 6/1955 | Snider et al. | | 40/539 |
| 2,746,196 A * | 5/1956 | Karr | | 43/3 |
| 2,763,952 A * | 9/1956 | Bruce | | 43/3 |
| 2,783,572 A * | 3/1957 | Rohan | | 43/3 |
| 2,812,947 A * | 11/1957 | Fatzinger et al. | | 273/404 |
| 2,816,384 A * | 12/1957 | Rexius | | 43/3 |
| D185,866 S * | 8/1959 | Anderson | | 43/2 |
| 2,917,835 A * | 12/1959 | Nelson | | 434/81 |
| 2,947,104 A * | 8/1960 | Johnson et al. | | 43/3 |
| 2,952,090 A * | 9/1960 | Pittenger | | 43/3 |
| 3,021,635 A * | 2/1962 | Sheridan | | 43/3 |
| 3,029,541 A * | 4/1962 | Palmer | | 43/3 |
| 3,163,418 A * | 12/1964 | Myers | | 273/408 |
| 3,245,168 A * | 4/1966 | Pool | | 43/3 |
| 3,350,808 A * | 11/1967 | Mitchell | | 43/3 |
| 3,707,798 A * | 1/1973 | Tryon | | 43/3 |
| 3,753,312 A * | 8/1973 | Hughes, Jr. | | 446/387 |
| 4,023,297 A * | 5/1977 | Jorgensen | | 43/3 |
| 4,082,280 A * | 4/1978 | Lang | | 273/408 |
| 4,120,110 A * | 10/1978 | Aeschliman | | 43/3 |
| 4,172,335 A * | 10/1979 | Farmer | | 43/3 |
| 4,203,600 A * | 5/1980 | Brown | | 273/409 |
| 4,228,977 A * | 10/1980 | Tanaka | | 43/2 |
| 4,239,825 A * | 12/1980 | Kaulfuss et al. | | 40/539 |
| 4,251,937 A * | 2/1981 | Curley | | 43/3 |
| 4,315,376 A * | 2/1982 | Eichenauer | | 40/124.19 |
| 4,318,240 A * | 3/1982 | Hillesland | | 43/3 |
| 4,334,643 A * | 6/1982 | Farmer | | 43/3 |
| 4,433,843 A * | 2/1984 | Bricco | | 273/408 |
| 4,475,674 A * | 10/1984 | Farmer | | 43/3 |
| 4,477,082 A * | 10/1984 | McKenzie et al. | | 273/407 |
| 4,503,101 A * | 3/1985 | Bennett | | 273/348 |
| 4,562,776 A * | 1/1986 | Miranda | | 446/108 |
| 4,611,421 A * | 9/1986 | Jacob | | 43/3 |
| D286,402 S * | 10/1986 | Huber | | D22/125 |
| 4,651,457 A * | 3/1987 | Nelson et al. | | 43/3 |
| 4,666,163 A * | 5/1987 | Hirschfeld | | 446/108 |
| 4,753,028 A * | 6/1988 | Farmer | | 43/3 |
| 4,773,178 A * | 9/1988 | Marek | | 43/2 |
| 4,821,444 A * | 4/1989 | Remus | | 43/2 |
| 4,845,872 A * | 7/1989 | Anderson | | 43/3 |
| 4,852,288 A * | 8/1989 | Payne et al. | | 43/2 |
| 4,869,702 A * | 9/1989 | Derby, III | | 446/488 |
| 4,925,429 A * | 5/1990 | Kaulfuss et al. | | 446/488 |
| 4,928,418 A * | 5/1990 | Stelly | | 43/3 |
| 4,972,620 A * | 11/1990 | Boler | | 43/3 |
| 5,003,722 A * | 4/1991 | Berkley et al. | | 43/3 |
| D345,590 S * | 3/1994 | Cummings | | D21/399 |
| 5,293,709 A * | 3/1994 | Cripe | | 43/3 |
| 5,335,438 A * | 8/1994 | Terrill | | 43/2 |
| 5,345,961 A * | 9/1994 | Yercha et al. | | 446/488 |
| D356,620 S * | 3/1995 | Weber et al. | | D22/125 |
| 5,498,001 A * | 3/1996 | Franks et al. | | 273/403 |
| 5,503,403 A * | 4/1996 | Morrell | | 273/408 |
| 5,546,692 A * | 8/1996 | Byers | | 43/2 |
| 5,570,531 A * | 11/1996 | Sroka | | 43/3 |
| 5,572,823 A * | 11/1996 | Savaria | | 43/2 |
| 5,572,824 A * | 11/1996 | Szolis | | 43/3 |
| 5,675,926 A * | 10/1997 | Manka | | 43/2 |
| 5,682,702 A * | 11/1997 | McKnight et al. | | 43/3 |
| 5,775,971 A * | 7/1998 | Brown | | 446/388 |
| 5,791,081 A * | 8/1998 | Turner et al. | | 43/2 |
| 5,797,208 A * | 8/1998 | Lessa | | 43/2 |
| 5,826,364 A * | 10/1998 | Bitting | | 43/2 |
| 5,895,045 A * | 4/1999 | Vilar | | 446/488 |
| 5,926,990 A * | 7/1999 | Okimoto | | 43/2 |
| 5,980,260 A * | 11/1999 | Caputi | | 446/101 |
| 5,992,071 A * | 11/1999 | Dahlquist | | 40/610 |
| D426,281 S * | 6/2000 | Davis | | D22/125 |
| 6,082,036 A * | 7/2000 | Cripe | | 43/2 |
| 6,115,953 A * | 9/2000 | Wise | | 43/2 |
| 6,120,344 A * | 9/2000 | Brown | | 446/388 |
| 6,145,528 A * | 11/2000 | Egnew et al. | | 43/2 |
| 6,254,100 B1 * | 7/2001 | Rinehart | | 273/408 |
| 6,296,005 B1 * | 10/2001 | Williams et al. | | 43/2 |
| 6,374,530 B1 * | 4/2002 | Mierau | | 43/2 |
| 6,381,896 B1 * | 5/2002 | Coker | | 43/2 |
| 6,408,865 B1 * | 6/2002 | Bliss | | 43/1 |
| 6,419,542 B1 * | 7/2002 | Liu | | 446/387 |
| 6,470,620 B1 * | 10/2002 | Acker | | 43/3 |
| 6,475,053 B1 * | 11/2002 | Liu | | 446/387 |
| 6,550,773 B2 * | 4/2003 | McKenzie et al. | | 43/2 |
| 6,557,278 B1 * | 5/2003 | Huang | | 40/124.19 |
| 6,626,732 B1 * | 9/2003 | Chung | | 446/387 |
| 6,634,132 B2 * | 10/2003 | Lorenz | | 43/2 |
| 6,745,510 B1 * | 6/2004 | Coker | | 43/2 |
| 6,761,609 B1 * | 7/2004 | Andersen | | 446/487 |
| 6,769,206 B2 * | 8/2004 | Olson | | 40/538 |
| 6,807,765 B2 * | 10/2004 | Watermann | | 43/2 |
| 6,874,270 B2 * | 4/2005 | Lorenz | | 43/2 |
| 6,925,745 B1 * | 8/2005 | Alessi | | 43/2 |
| 6,957,509 B2 * | 10/2005 | Wright | | 43/2 |
| 7,134,663 B1 * | 11/2006 | Lowe et al. | | 273/403 |
| 7,318,764 B2 * | 1/2008 | Elias | | 446/108 |
| 7,337,575 B2 * | 3/2008 | Hulley et al. | | 43/3 |

| | | | | |
|---|---|---|---|---|
| 2002/0078653 A1* | 6/2002 | Jean .......................... 446/108 |
| 2002/0095848 A1* | 7/2002 | Northouse ...................... 43/3 |
| 2003/0024146 A1* | 2/2003 | Spady et al. ..................... 43/3 |
| 2003/0046840 A1* | 3/2003 | Evans et al. ................... 40/538 |
| 2003/0162473 A1* | 8/2003 | Yang .......................... 446/108 |
| 2007/0199228 A1* | 8/2007 | Johnson ......................... 43/3 |

FOREIGN PATENT DOCUMENTS

| | | |
|---|---|---|
| GB | 2230171 | 10/1990 |
| GB | 2247819 A * | 3/1992 |

* cited by examiner

HUNTING DECOY

CROSS-REFERENCE TO RELATED APPLICATION

This application claims the benefit of U.S. Provisional Patent Application Ser. No. 60/795,185, filed Apr. 27, 2006.

BACKGROUND OF THE INVENTION

1. Field of the Invention

The present invention relates to hunting equipment and accessories, and particularly to a hunting decoy that provides a freestanding decoy depicting multiple animals in a realistic image viewable from any direction.

2. Description of the Related Art

Hunters commonly employ the use of lures, and particularly hunting decoys, in order to attract a particular animal to a target location. Hunting decoys typically provide a visual simulation of the type of animal that is being hunted, and are typically rendered to full scale. An animal observing the decoy believes the hunting decoy to be a genuine animal of the same species, and thus believes the location to be safe for feeding or other purposes.

Decoys that simulate an animal in all three dimensions (i.e., a life-size, scale model of the animal) are generally employed for usage with small animals, since larger three-dimensional decoys are both heavy and unwieldy. For larger animals, such as deer, two-dimensional simulations are commonly utilized.

These two-dimensional simulations typically include a panel that is painted, or otherwise imprinted, with a life-like rendering of the particular animal. Such two-dimensional simulations, however, only provide a realistic simulation when viewed from a particular range of angles. When the target animal views the decoy outside of this range, the two-dimensional nature of the decoy becomes apparent. Such decoys are usually fixed to the ground by one or more stakes or spikes, or fixed to a tree trunk, tree branch, or whatever other supporting structure may be at hand.

Further, hunting decoys typically only present a simulation of a single animal. The effectiveness of a lone decoy in attracting game is debatable. Some hunters feel that game is only attracted to a herd, or at least a pair of animals. When it is desired to lure the game by decoys depicting two or more animals close together, it becomes necessary to stake multiple decoys at the same location, and further, it is necessary to point multiple decoys in several directions to simulate multiple animals when viewed from any direction. Thus, a hunting decoy solving the aforementioned problems is desired.

SUMMARY OF THE INVENTION

The hunting decoy includes first and second panels, each panel having an image formed on front and rear surfaces thereof to simulate a pair of animals facing opposite directions. Each of the first and second panels is shaped to have a silhouette resembling the animals, and includes a pair of head portions, a main body portion or torso, and a pair of forelegs. The images simulate, respectively, a pair of animal heads, a pair of partial animal bodies, and a pair of animal legs. For example, the animal image may be that of a whitetail deer.

The first panel has a first slot formed therein, which extends from an upper edge of the main body portion downward to a central region of the first main body portion. The second panel has a second slot formed therein, which extends from a lower edge of the main body portion upward to a central region of the second main body portion. The first panel is releasably joined to the second panel at their respective slots, and, preferably, the first panel is positioned substantially orthogonal to the second panel in cruciform manner so that the decoy is freestanding. Depending upon the viewing angle, at least one animal image is visible, and usually more than one image is visible. The hunting decoy includes a total of four heads. However, the number of animals simulated depends upon the viewing position and angle of an onlooking animal. The pairs of legs are adapted for releasable mounting of the hunting decoy in the ground, or on any suitable support surface.

Each pair of heads may project upwardly from the respective main body portion, may project downwardly from the main body portion, or one head may project upwardly and the other head may project downwardly.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
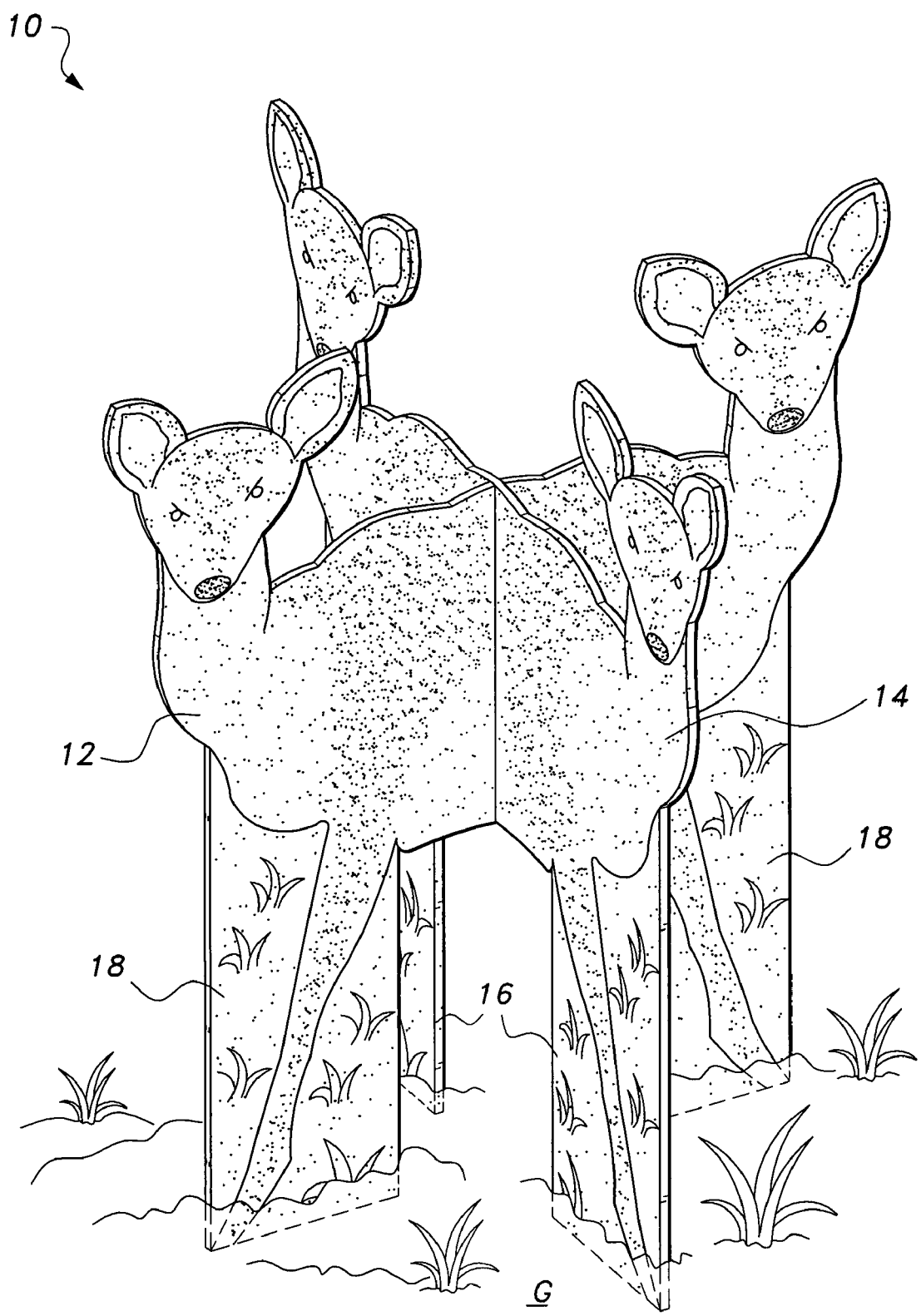
FIG. 1 is an environmental, perspective view of a hunting decoy according to the present invention.

Referring to FIG. 1, there is shown a first embodiment of a hunting decoy according to the present invention, designated generally as 10 in the drawings. Depending upon the position and viewing angle of an animal viewing the decoy 10, the hunting decoy 10 visually simulates either a single animal or a plurality of animals. As the animal observer moves with respect to hunting decoy 10, the visual simulation presented by hunting decay 10 is maintained through a full 360° of arc about the hunting decoy 10. It should be understood that the representation of deer, illustrated in the drawings, is for exemplary purposes only, and that the hunting decoy 10 may be imprinted with the images of any desired game animal.

Figure 2:
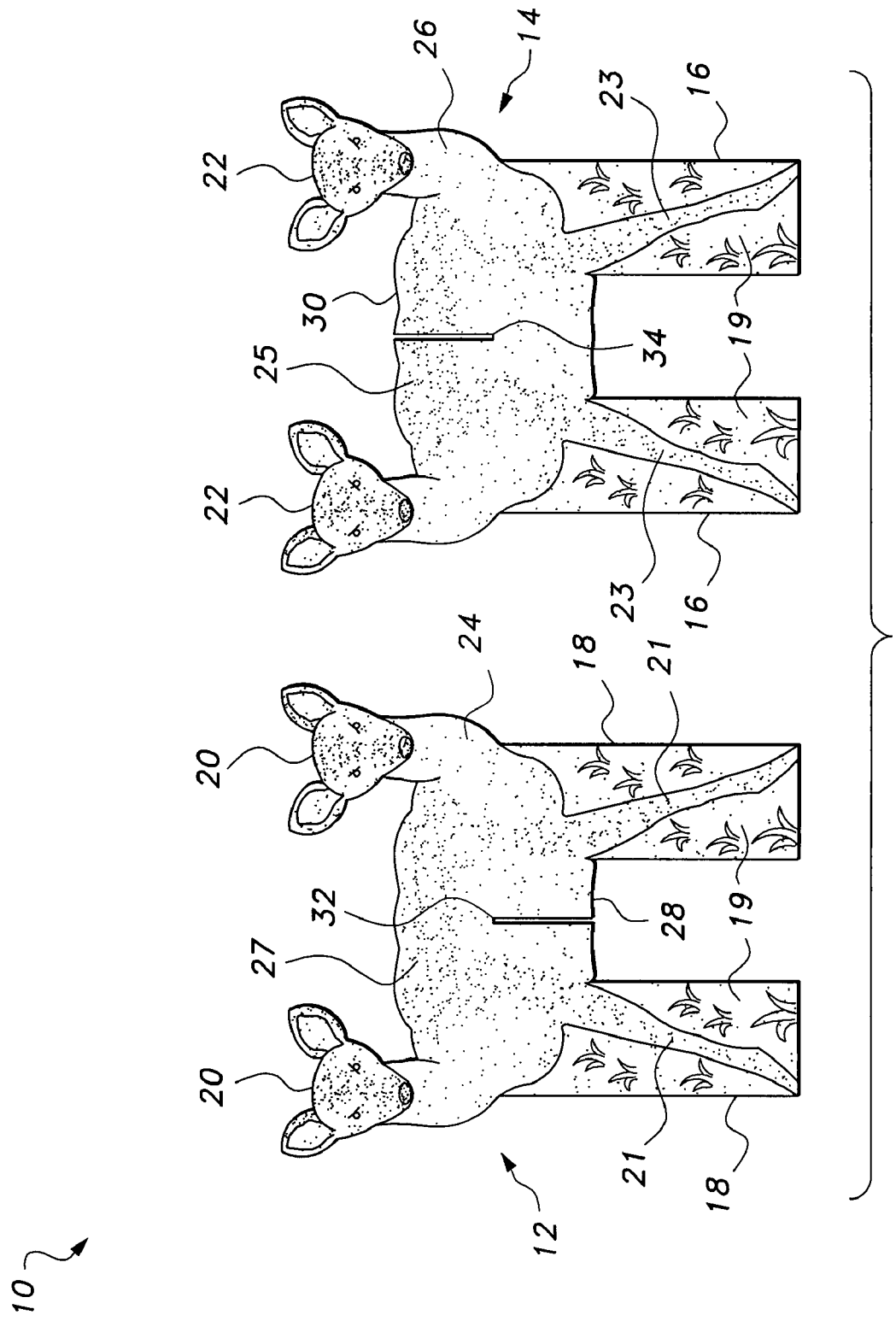
FIG. 2 is an exploded plan view of the hunting decoy according to the present invention.

As shown in FIGS. 1 and 2, the hunting decoy 10 includes a first panel 12 and a second panel 14, each of which is substantially symmetrical in contour and design about a central vertical axis, as shown. First panel 12 includes a torso or main body portion 24 and a pair of head portions 20 projecting upwardly from opposed ends thereof. Further, a pair of legs 18 project downwardly from the opposed ends of the main body portion 24, forming vertical supports. Similarly, the second panel 14 includes a main body portion 26, similar head portions 22, and similar legs 16.

As shown, the main body portions 24 and 26, along with the respective head portions 20, 22, are contoured to each represent a pair of animals, with the front half of each animal being joined to the other along the central vertical axis of the respective main body portion. The main body portions 24, 26 and the head portions 20, 22 are further provided with high resolution images 27, 25, respectively, on both the front and rear faces of panels 12 and 14 to visually simulate the respective bodies and heads of the simulated animals. Images 27, 25 may be a photographic representation of the simulated animals, or may be any other suitable visual reproduction or facsimile of the simulated animals.

The legs 16, 18 are each preferably substantially rectangular in contour, as shown, although it should be understood that legs 16, 18 may have any desired configuration. The images on the legs preferably visually represent both the simulated animal's legs and a background image that blends in with the environment so that legs 16, 18 have sufficient width to provide a stable support for the decoy 10. As best shown in FIG. 2, legs 18 of first panel 12 include image 21 representing the exemplary deer's legs, and legs 16 of second panel 14 include a similar image 23. Further, each leg 18, 16 includes image background 19 simulating a wooded environment to represent the animal standing in a wooded environment, preferably matching the environment in which the decoy 10 has been positioned. As shown in FIG. 1, legs 16, 18 are adapted for mounting on ground G of the hunting environment, and image backgrounds 19 are preferably selected by the user to match the visual aspects of the environment associated with the locale of ground area G. The image 21 of the animal's legs and the background image 19 may be separate images combined on the same leg portion 16, 18, or unitary images.

Panels 12, 14 are preferably formed from a waterproof material, such as a planar sheet of corrugated plastic board, although it should be understood that any suitable material may be used, e.g., closed-cell foam, fluted plastic, or other rigid or semi-rigid material. Preferably, panels 12, 14 are dimensioned and configured to present life-size simulations of game animals. However, hunting decoy 10 may be dimensioned and configured as desired.

Figure 3:
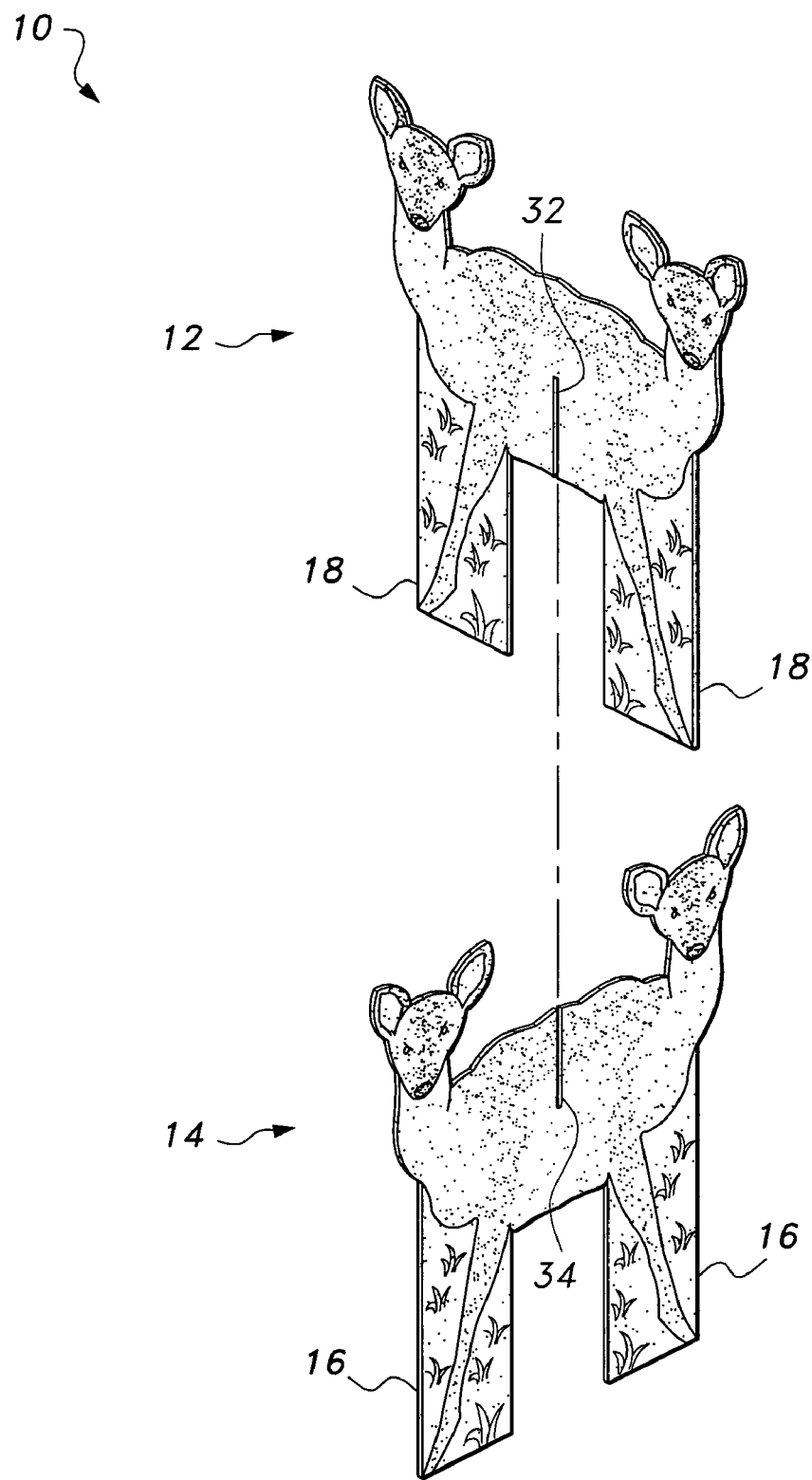
FIG. 3 is an exploded perspective view of the hunting decoy according to the present invention.

As best shown in FIG. 2, first panel 12 has a slot 32 formed therein, which extends from a lower edge 28 of main body 24 substantially vertically to a central region of main body portion 24. Second panel 14 has a corresponding slot 34, which extends downwardly from an upper edge 30 of main body portion 26 to a central region of the main body portion 26. As shown in FIG. 3, first panel 12 is releasably joined to second panel 14 at their respective slots 32, 34, forming the joined hunting decoy 10 illustrated in FIG. 1. Preferably, first panel 12 is arranged substantially orthogonally to second panel 14, providing a stable cruciform structure, which is freestanding on ground surface G without the need of further supports. Additionally, the joining of first panel 12 with second panel 14 to form the decoy 10 illustrated in FIG. 1 provides a visual simulation of at least one animal, which is maintained at any viewing point in a 360° arc about the decoy 10.

In addition to respective slots 32, 34, which are formed substantially vertically and centrally through panels 12, 14, respectively, at least one score line, living hinge, or the like, may be formed through each panel, allowing panels 12, 14 to be folded for transportation and storage. Further, a separate bag or any other suitable container may be provided for the storage and transport of panels 12, 14. Images 25, 27 may be formed directly on panels 12, 14, or on a substrate, such as transparent vinyl, paper or the like, which is adhered or attached to panels 12, 14.

Figure 4:
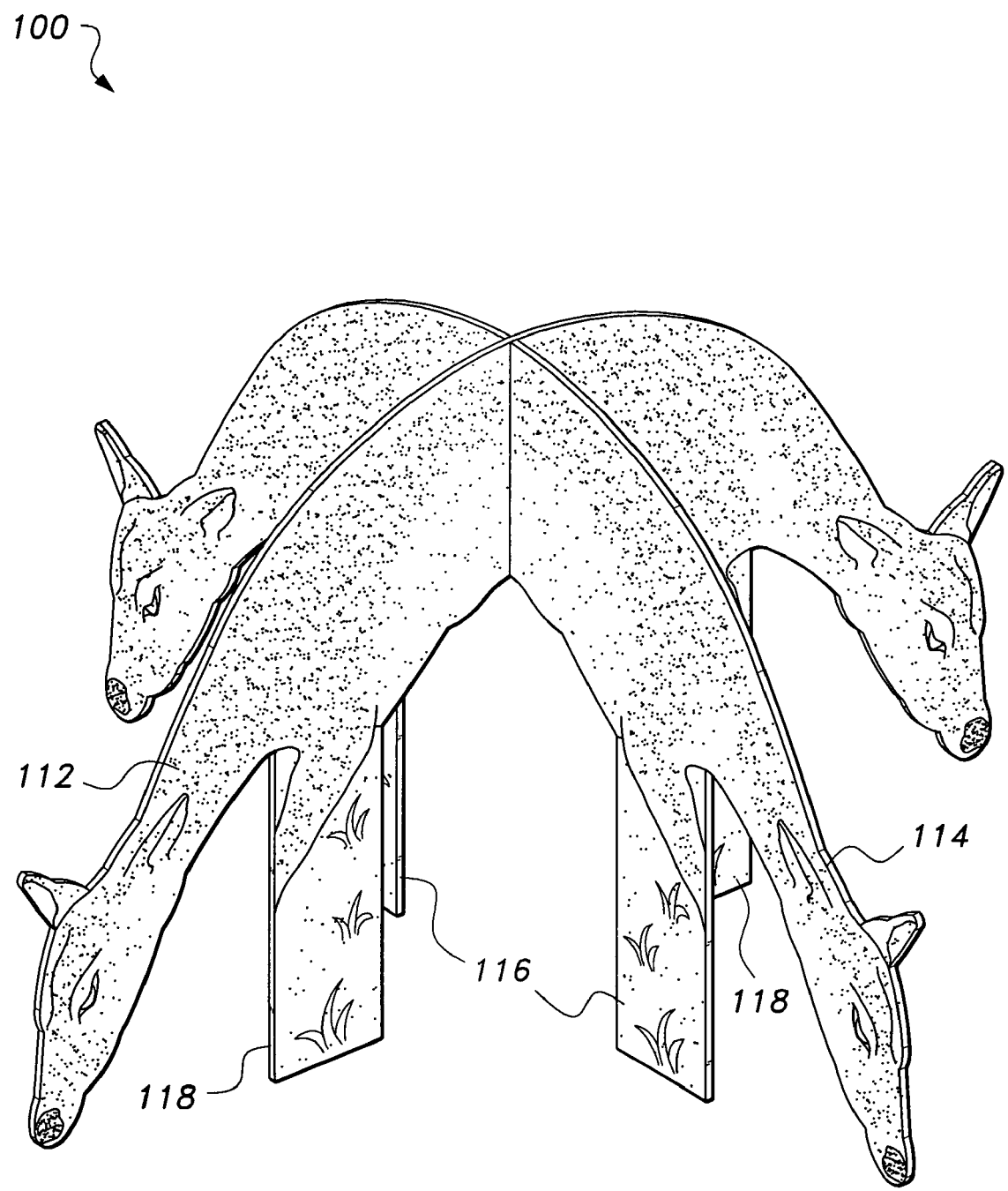
FIG. 4 is a perspective view of an alternative embodiment of the hunting decoy according to the present invention.
Figure 5:
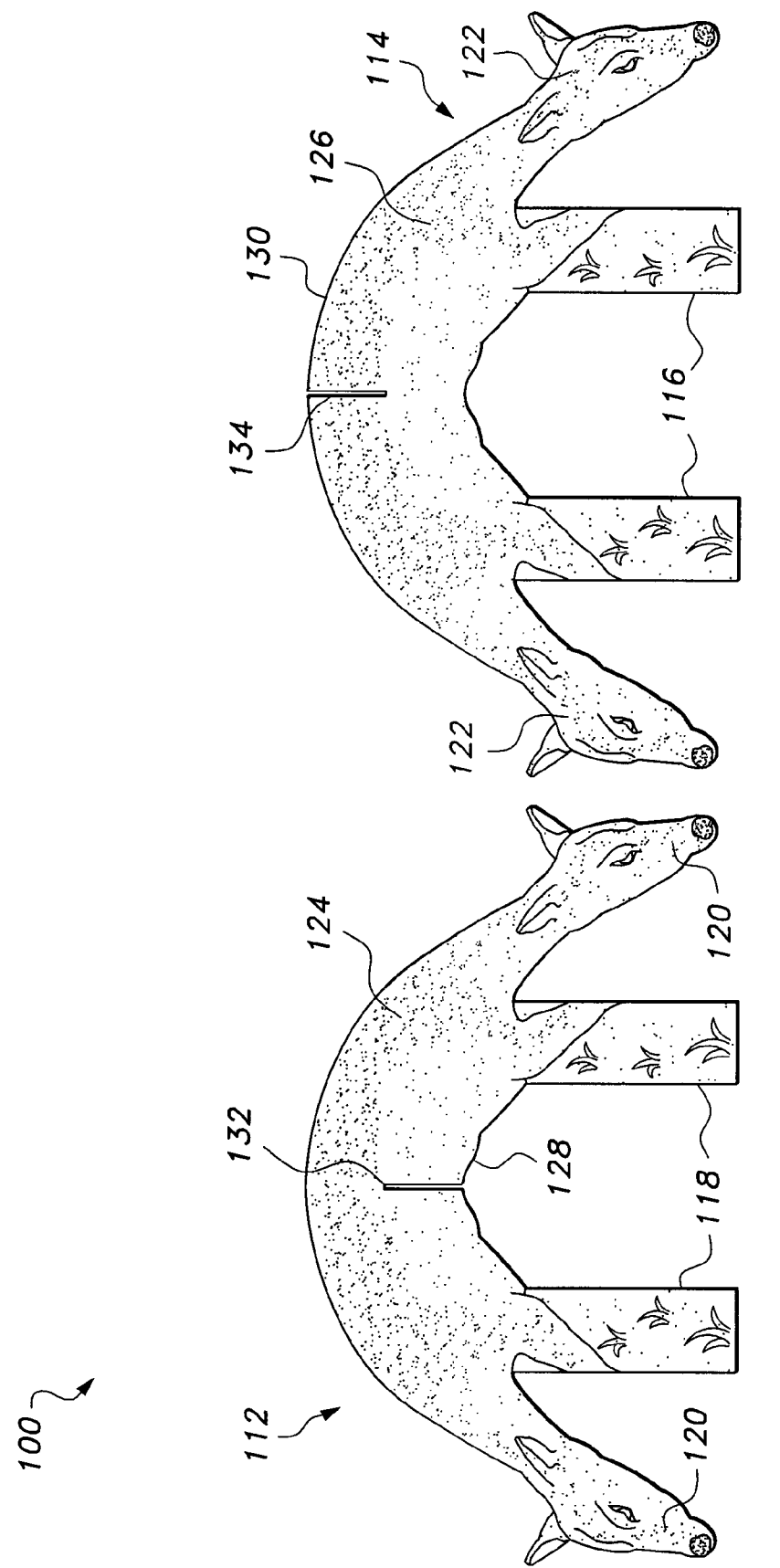
FIG. 5 is an exploded plan view of the hunting decoy of FIG. 4.

The hunting decoy 100, illustrated in FIGS. 4 and 5, is similar to hunting decoy 10 shown in FIGS. 1-3. However the head portions 120, 122 of first panel 112 and second panel 114, respectively, project substantially downwardly, as shown, as opposed to the upwardly projecting head portions 20, 22 of FIGS. 1-3. Hunting decoy 100 provides a visual simulation of at least one animal feeding or drinking, with its head(s) directed towards ground G.

Hunting decoy 100 is similar in construction to hunting decoy 10 of FIGS. 1-3. First panel 112 includes a main body portion 124 having a pair of head portions 120 formed on opposed side ends thereof and projecting downwardly therefrom. A pair of legs 118 project downwardly from the main body portion 124, and a slot 132 is formed in main body portion 124, extending upward from lower edge 128 to a central region of main body portion 124. Similarly, second panel 114 includes a main body portion 126 having a pair of head portions 122 formed on opposed side ends thereof and projecting downward therefrom. A pair of legs 116 project downward from the main body portion 126, and a slot 134 is formed in main body portion 126, extending downward from upper edge 130 to a central region of main body portion 126. The first and second panels are joined at their slots to form the three-dimensional cruciform structure, as described above with respect to the embodiment of FIGS. 1-3.

Figure 6:
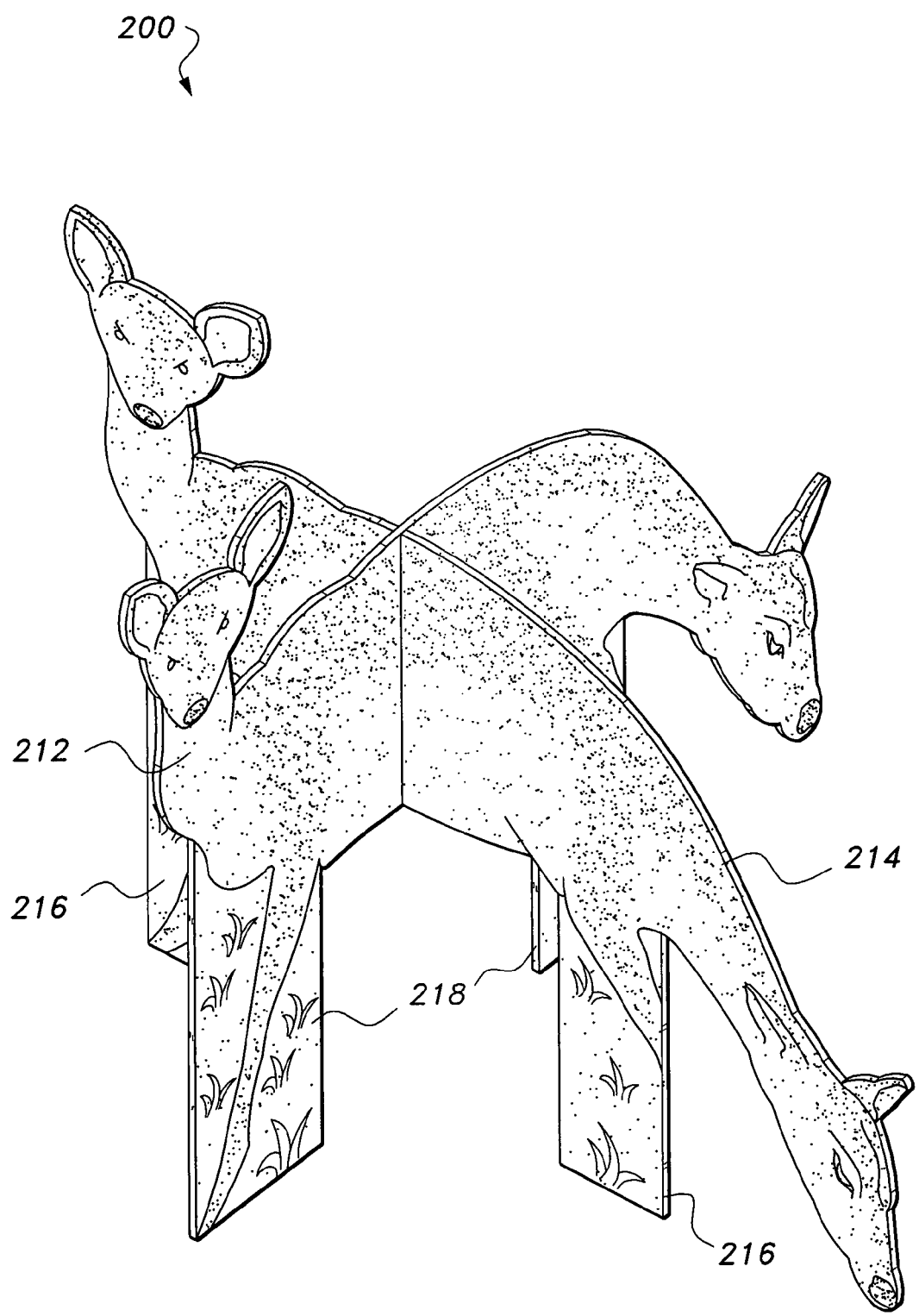
FIG. 6 is a perspective view of another alternative embodiment of the hunting decoy according to the present invention.
Figure 7:
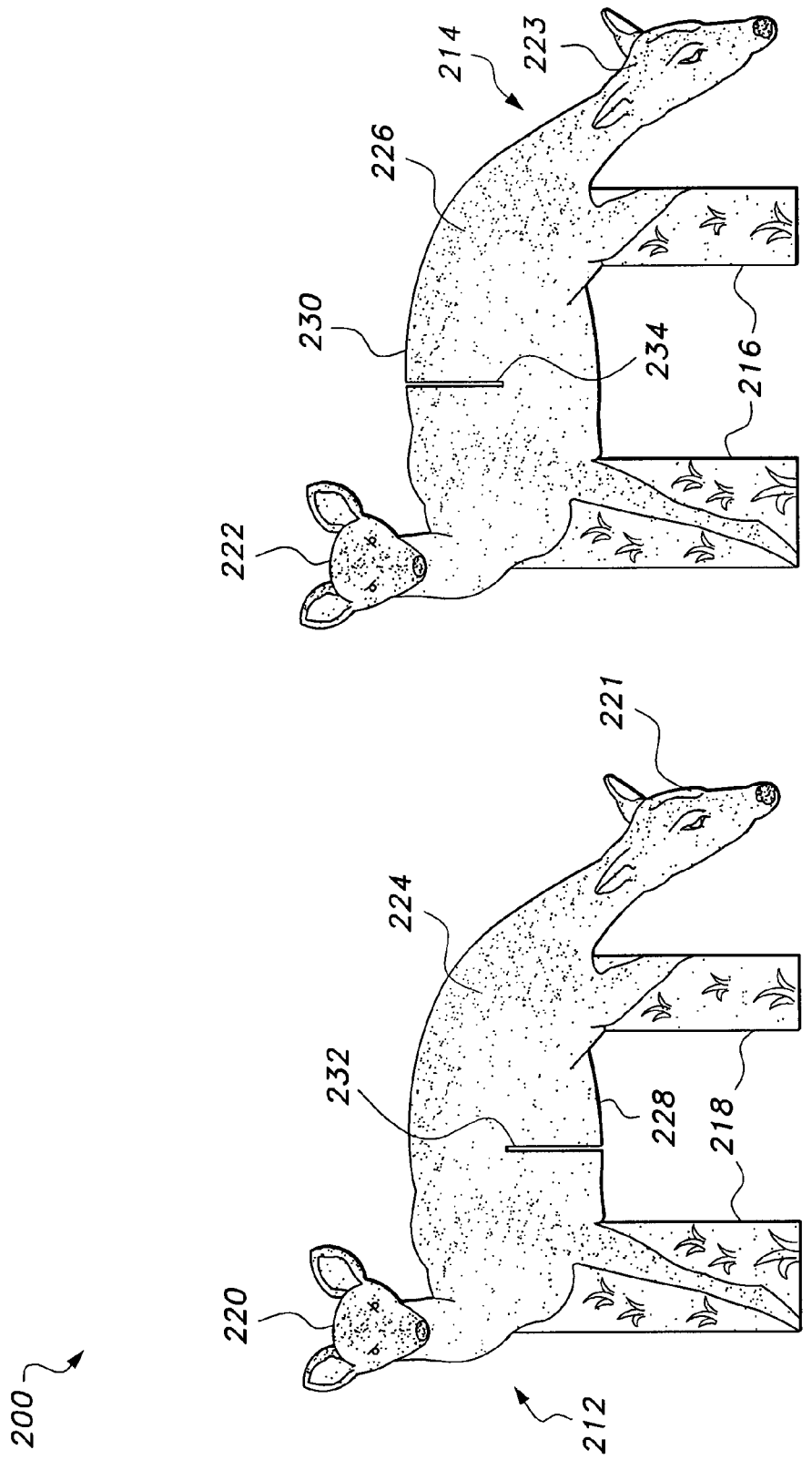
FIG. 7 is an exploded plan view of the hunting decoy of FIG. 6.

Further, the hunting decoy 200, illustrated in FIGS. 6 and 7, is similar to hunting decoy 10 of FIGS. 1-3 and hunting decoy 100 of FIGS. 4 and 5. However, first panel 212 includes a first head portion 220 that projects upward and a second head portion 221 that projects downward. Similarly, second panel 214 includes a first head portion 222 that projects upward and a second head portion 223 that projects downward.

First panel 212 further includes a pair of legs 218 projecting downward from the main body portion 224, and a slot 232 is formed in main body portion 224 extending upward from lower edge 228 to a central region of main body portion 224. Similarly, second panel 214 includes a pair of legs 216 projecting downward from the main body portion 226, and a slot 234 is formed in main body portion 226 extending downward from upper edge 230 to a central region of main body portion 226. The first and second panels are joined together, at their slots, in a manner similar to that described above to form the three-dimensional cruciform structure.

Although each hunting decoy 10, 100, 200 is shown as being formed from a respective pair of substantially identically contoured first and second panels, it should be understood that the first panel of one embodiment may be used in combination with the second panel of a different embodiment to form a wider variety of animal simulations. For example, the first panel 12 of hunting decoy 10 may be joined to the second panel 214 of hunting decoy 200.

Figure 8:
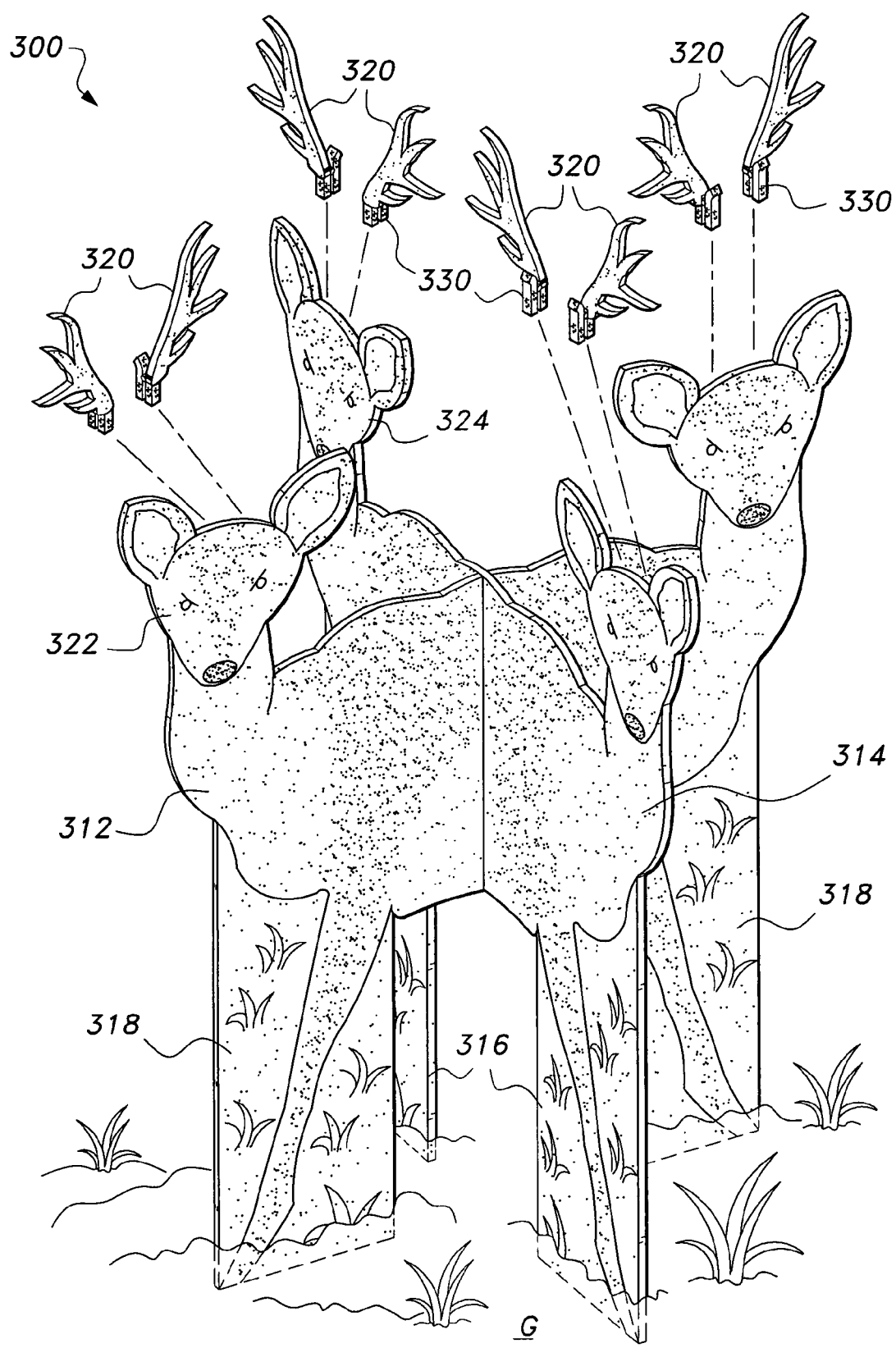
FIG. 8 is a perspective view of another alternative embodiment of the hunting decoy according to the present invention.

In embodiment 300 of FIG. 8, the hunting decoy includes first panel 312 and second panel 314, similar to the first and second panels of the embodiment shown in FIG. 1, further having respective legs 318 and 316. Hunting decoy 300 further includes detachable decorative features 320, shown here in the form of detachable antlers. Detachable decorative features 320 may simulate any desired appendage of the game animal, including antlers, tails, or any other detachable element.

Antlers 320 are detachably fixed to each head portion 322, 324, respectively, through the use of any suitable means for releasable attachment. In the preferred embodiment, clips 330 are provided for releasably attaching features 320 to the head portions 322, 324. It should be understood that clips 330 are shown for exemplary purposes only (as are the particular simulated antlers 320), and that any suitable means for releasable fastening may be used. For example, antlers 320 may be fixed to head portions 322, 324 through the engagement of slots formed in both antlers 320 and head portions 322, 324, similar to the slotted engagement of first and second panels 312, 314, respectively.

It is to be understood that the present invention is not limited to the embodiments described above, but encompasses any and all embodiments within the scope of the following claims.

I claim:

1. A hunting decoy, comprising first and second elongate panels, each of the panels having:
    laterally opposed ends and a central portion joining the laterally opposed ends in a shape generally simulative of first and second animal heads joined by a common torso;
    a pair of substantially rectangular leg portions, each said substantially rectangular leg portion projecting downwardly from a respective one of said laterally opposed ends;
    high resolution images of a game animal corresponding to a shape of the first and second animal heads and common torso, the images being disposed on first and second opposed faces of the respective panel; and
    a slot defined in the central portion of the respective panel, the slot in the first panel extending vertically from a top edge of the first panel medially inward and the slot in the second panel extending vertically from a bottom edge of the second panel medially inward;
    whereby the second panel is slidably disposed over the first panel so that the panels overlap with the slots being vertically aligned and interlocking with the central portion of the respective overlapping panel in cruciform manner to form a freestanding decoy supported on the leg portions.

2. The hunting decoy as recited in claim 1, wherein the first and second animal heads of each of said first and second elongate panels project upwardly from the common torso to which the heads are attached.

3. The hunting decoy as recited in claim 1, wherein the first and second animal heads of each of said first and second elongate panels project downwardly from the common torso to which the heads are attached.

4. The hunting decoy as recited in claim 1, wherein the first animal head of each of said first and second elongate panels projects upwardly and the second animal head of each of said first and second elongate panels projects downwardly from the common torso to which the heads are attached.

5. The hunting decoy as recited in claim 1, wherein the first and second animal heads of each of said first and second elongate panels are simulative of deer heads.

6. The hunting decoy as recited in claim 1, wherein the high resolution images are photographs imprinted on said first and second elongate panels.

7. The hunting decoy as recited in claim 1, wherein said high resolution images further comprise images of at least one leg of the game animal, the images of the at least one leg being formed on the pairs of substantially rectangular leg portions.

8. The hunting decoy as recited in claim 7, wherein said high resolution images further comprise images of foliage, the images of foliage being formed on the pairs of substantially rectangular leg portions.

9. The hunting decoy as recited in claim 1, further comprising detachable appendages releasably mounted to said first and second elongate panels.

10. The hunting decoy as recited in claim 9, further comprising means for releasably mounting the detachable appendages to said first and second elongate panels.

11. The hunting decoy as recited in claim 10, wherein the means for releasably mounting the detachable appendages comprises at least one releasable clip.

12. The hunting decoy as recited in claim 11, wherein said detachable appendages are simulative of deer antlers.

* * * * *